United States Patent Office 2,753,160
Patented July 3, 1956

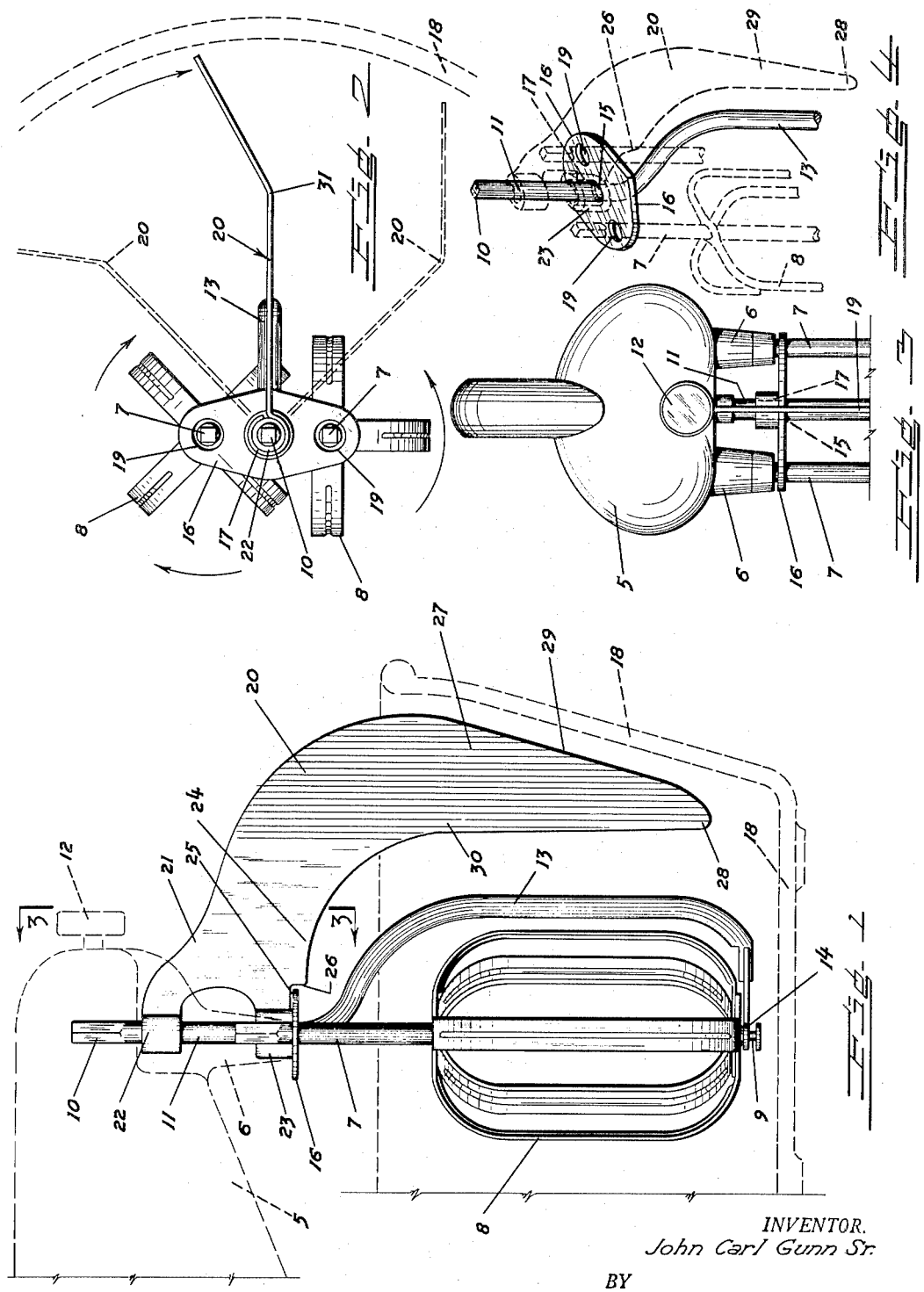
July 3, 1956     J. C. GUNN, SR     2,753,160
MIXER ATTACHMENT FOR ELECTRIC MIXERS
Filed Oct. 1, 1952
INVENTOR.
John Carl Gunn Sr.
BY
ATTORNEY

2,753,160

MIXER ATTACHMENT FOR ELECTRIC MIXERS

John C. Gunn, Sr., Denver, Colo.

Application October 1, 1952, Serial No. 312,617

2 Claims. (Cl. 259—84)

This invention relates to new and useful improvements in electric mixers and an important object of the invention is to provide an attachment therefor which will improve the operation and efficiency of the mixing or agitating operations.

Another object of the invention is to provide an improved baffle or deflector attachment for food mixers, which will direct the material which it scrapes from the side walls of the bowl back to the agitators near the center of the bowl; such attachment having a floating and swinging action to be adjustable to the consistency of the material being mixed for increased efficiency.

A further object of the invention is to provide an attachment of the above character which can be easily attached for operation to mixers of well known makes, and easily removed therefrom for cleaning; the construction of the attachment and blade being such that they are strong and durable, inexpensive and are very easy to clean.

Other objects and advantages of the invention will become apparent during the course of the following description.

In the accompanying drawing forming a part of the description and wherein like numerals are employed to designate like parts throughout the several views:

Fig. 1 is a side elevational view of the attachment shown assembled with an electric food mixer and bowl of known design shown in dotted lines;

Fig. 2 is a top plan of the same showing the bowl in dotted lines with the blade in full and dotted lines to show two extreme positions and one intermediate position of the blade;

Fig. 3 is a front elevation of the mixer with the attachment mounted thereon; and Fig. 4 is a perspective view of the attachment in operative position relative to the agitator and deflector shafts illustrating the ready removability of the blade.

Referring now more particularly to the drawing for details of construction and wherein for the purpose of illustration, and not for limitation, a preferred embodiment of the invention is shown, the numeral 5 designates the forward end of the motor head or casing of a known make of electric mixer such as are commonly used in kitchen for mixing foods, batters, etc. The forward underside of this head is provided with a pair of vertical agitator shaft sockets 6 for the reception of a pair of agitator or heater shafts 7 each having the usual four agitator blades 8 equipped at their lower ends with trunnion 9. The upper ends of these shafts are polygonal to connect with a drive mechanism within the motor head 5 for rotating them in opposite directions in a manner well understood in the art. The underside of this head is also provided with a third vertical socket arranged between and equidistant from the pair of sockets 6 to receive the upper polygonal end 10 of a shaft 11 which is held in the motor head 5 by a thumb screw 12. This shaft 11 has a stationary deflector blade 13 extended therefrom and curved laterally and downwardly beyond the agitator blades 8 to terminate at its lower end in a pair of bearing arms 14 to rotatably receive the trunnions 9 of the blades 8. The shaft 11 is provided with a supporting shoulder 15 at a point above where the blade 13 joins the shaft.

The attachment of this invention comprises a flat supporting plate 16 of narrow elongated form with its longer edges tapering as shown. The center of this plate is provided with a round opening which may if desired be surrounded by an upstanding circular boss 17 through which the central shaft 11 extends so that the plate is supported on the shaft shoulder or collar 15 and the upper end of this shaft 11 can be inserted itno its socket and fastened in the motor head by the thumb screw 12. If desired, the shaft 11 may be welded or otherwise secured in the center hole in the plate 16 and the boss 17 eliminated. Thus this supporting plate 16 is supported above the usual mixing bowl 18. The ends of this plate are provided with openings 19 larger than the agitator shafts 7 whereby the latter rotate freely therein after being inserted into their respective sockets 6 of the motor head or casing 5. Thus the center shaft 11, blade 13 and plate 16 can be readily attached to and detached from the head 5 along with the two agitator shafts 7 by simply manipulating the screw 12. The agitator shafts, can if desired, be detached from the bearing arms 14 for cleaning and reassembling, or they may be permanently associated therewith. The shaft 11 and blade 13 may be considered part of the agitator means.

With the mixing bowl 18 in operative position as shown in Figs. 1 and 2 and material is being mixed therein by the agitators 8, the bowl tends to rotate in a clockwise direction by reason of its rotary mounting in the stand of the mixer and by the movement or flow of the material churned therein. As indicated by the arrows in Fig. 2, the material in the bowl is churned and agitated between the oppositely rotating agitator blades 8 and is flowed toward the side walls of the bowl and tangentially thereof to cause the material to flow clockwise which causes the bowl to rotate in the same direction. This material, and especially batter tends to adhere to the side walls of the bowl and unless scraped therefrom with a spoon or spatula, will continue to adhere to these walls and only a small amount of the material will remain near the center of the bowl to be mixed by the agitators.

In order to keep the material away from the side walls of the bowl and constantly moving inwardly to the center thereof between the agitator blades 8 where all of it will be quickly and thoroughly mixed without manual assistance and scraping back with a spatula, a novel floating baffle and scraper blade 20 has been devised. It is made of plastic, metal or any suitable material having an outline similar to a boomerang, but in the form of a flat blade. It is adapted to be assembled with the mixer so that it is disposed vertically in the bowl. Its upper end 21 is adapted to extend horizontally above the bowl as shown, and is provided with a pair of vertically spaced and aligned integral sleeves 22 and 23 formed by rolling the vertical edge of this end into such sleeves. The upper sleeve 22 is smaller in diameter than the lower sleeve 23 and consequently has a smaller opening therethrough, but the openings in both sleeves are larger than the diameter of the central shaft 11 whereby they may be easily slipped on and off of this shaft when the latter is detached from the mixer. The openings through these sleeves may be made to have a fairly close sliding fit on the shaft 11 whereby the blade 20 does not have enough play to rock vertically on the shaft. The same can be accomplished by the use of the boss 17, which can have a sliding fit with the shaft 11 and lower sleeve 23, and this boss can be a separate independent element which can be detached or it can be an integral part of the plate 16 or be welded thereto. If it be desired to allow considerable play between the sleeves 22 and 23 and the shaft 11 whereby the blade 20 can rock vertically, the openings in the sleeves are made larger in diameter than the shaft 11 to provide the necessary looseness for the blade to be tilted inwardly and outwardly of the shaft and bowl during the mixing operation. The lower sleeve 23 rests upon the top surface of the plate 16 to freely rotatably support the baffle blade 20. The lower edge 24 of the horizontal portion 21 of this blade immediately adjacent the sleeve 23 is cut away or notched as at 25 to provide a vertical shoulder 26 arranged beyond the edge of the supporting plate 16, but adapted to contact this edge of the plate 16 and be stopped when the blade 20 is swung in either direction about the axis of shaft 11 to the limit of its movements as shown by the dotted lines in Fig. 2.

The lower part 27 of the blade 20 extends vertically down into the bowl to a point adjacent the bottom thereof where it terminates in a slightly inwardly extending end 28 with a rounded point. This lower part of the blade is broad enough to occupy most of the distance between the side wall of the bowl and the agitators 8. The outer longitudinal edge 29 of the lower portion inclines upwardly and outwardly parallel with the side wall of the bowl and is arranged in fairly close relation thereto in all of its various angular positions. The inner longitudinal edge 30 of this lower part 27 extends substantially vertically, so that this lower part tapers from a small lower end up to a larger or wider upper end merging into the wide horizontal portion 21 of the blade. At about the juncture of the vertical and horizontal portions 21 and 27, the blade is bent or curved along a vertical line 31 in a counterclockwise direction with respect to the bowl movement to coact with the tapered shape of the blade in directing the material being mixed toward the center of the bowl and between the agitator blades 8 to thereby greatly increase the quantity of material fed to the agitator blades as well as to cause the material to be folded or turned over at its top nearer the center of the bowl where it meets with the broadest part of the blade. The blade 20 with a loose fit on the shaft 11 may float or rock vertically with its outer edge 29 approaching and receding from the side walls of the bowl; or if the blade sleeves 22 and 23 have a fairly loose sliding fit with the shaft 11 and/or boss 17, such rocking movement can be precluded and the edge 29 can be arranged closer to the side wall of the bowl to operate at a relatively fixed distance therefrom. In either event, the blade 20 is freely rotatable upon the shaft 11 to float and turn within its range of movement as determined by the shoulder 26 coming in contact with the edge of the supporting plate 16. With light mixes of batter or the like, the blade 20 may start in the position of the upper dotted line position in Fig. 2 and as the batter thickens it will cause the blade to swing clockwise until its shoulder 26 engages the plate 16 and comes to a stop. Moreover, the operator can swing the blade 20 back and forth or position it wherever he desires to best perform the functions of the device and to scrape the material from the walls of the bowl. However, unattended, the blade will automatically perform these functions. The upper horizontal part 21 of the blade 20 extends radially of the shaft 11 and the outer vertical portion 27 is bent at an angle of about 30 degrees to this radial portion to extend at an angle to the side wall of the bowl other than a radial angle as shown in Fig. 2.

To take the device apart for use without the blade or to clean the device, the motor head 5 is tipped back to remove the agitators from the bowl, the thumb nut 12 is then simply loosened and the agitator with blades 13 and 20 can be removed from the head 5, after which the blade 20 can be slipped off of the shaft 11, along with the supporting plate 16 for washing.

The sleeves 22 and 23 will, of course, vary in size of opening or bore in accordance with the diameter of the shaft, such as shaft 11, of the particular mixture to which the attachment is adapted.

From the foregoing, it is believed that the construction and operation of the attachment is clear, and it will be obvious that various changes in the construction and arrangement of the device can be made without departing from the spirit of the invention or the scope of the appended claims.

I claim:

1. A baffle device for use with a rotatable mixing bowl and the rotary blades of an electric mixer for directing material from a marginal position in the mixing bowl into the rotary agitator blades, said device comprising a baffle blade adapted to be detachably, vertically juxtaposed into a mixing bowl, said blade adapted to be mounted between the agitator of an electric mixer and the wall of said mixing bowl, said blade being tapered from a narrow lower end to a broader upper end where it occupies a major portion of the distance between the mixer agitator and the wall of the mixing bowl, and sleeve means extending laterally and offset from said broader upper end, suspension means for suspending said baffle blade from said mixer, said sleeve means loosely fitting said suspension means for free pivotal movement thereof through an arc within the bowl, said blade being bent adjacent said sleeves, whereby the blade extends at an angle to the radius of the bowl.

2. A baffle device for use with a rotatable mixing bowl and the rotary blades of an electric mixer for directing material from a marginal position in the mixing bowl into the rotary agitator blades, said device comprising a baffle blade adapted to be detachably and substantially vertically juxtaposed in a mixing bowl, said blade adapted to be mounted between the agitator of an electric mixer and the wall of said mixing bowl, said blade being tapered from a narrow lower end to a broader upper end where it occupies a major portion of the distance between the mixer agitator and the wall of the mixing bowl, and detachable suspension means depending laterally and offset from said upper end and arranged to suspend said blade adjacent a rotating shaft of said mixer agitator, said suspension means being constructed and arranged to suspend said blade for pivotal movement through an arc in said bowl, said blade being bent adjacent to and spaced from said suspended means whereby the vertical portion thereof extends at an angle to its suspension means.

References Cited in the file of this patent
UNITED STATES PATENTS

| | | |
|---|---|---|
| 1,715,545 | Epstein | June 4, 1929 |
| 2,104,268 | Nielsen | Jan. 4, 1938 |
| 2,562,790 | Houston | July 31, 1951 |